United States Patent [19]
Ramsdell et al.

[11] Patent Number: 5,754,372
[45] Date of Patent: May 19, 1998

[54] ACTUATOR BEARING CARTRIDGE FOR TOP DOWN ASSEMBLY

[75] Inventors: Richard G. Ramsdell, Saratoga; John D. Treder, Santa Clara; Jon Ikegami, Foster City; Raghu Gururangan, Pleasonton, all of Calif.

[73] Assignee: Quantum Corporation, Milpitas, Calif.

[21] Appl. No.: 693,824

[22] Filed: Jul. 26, 1996

[51] Int. Cl.$^6$ ............................................. G11B 5/55
[52] U.S. Cl. ............................................. 360/106
[58] Field of Search .................... 360/106, 98.07, 360/99.04, 99.08, 109; 369/255, 269; 310/51, 75 D, 90; 384/113

[56] References Cited

U.S. PATENT DOCUMENTS

| | | | |
|---|---|---|---|
| 4,754,353 | 6/1988 | Levy | 360/106 |
| 4,945,435 | 7/1990 | Boigenzahn et al. | 360/106 |
| 4,984,115 | 1/1991 | Takahashi et al. | 360/106 |
| 5,146,450 | 9/1992 | Brooks et al. | 369/244 |
| 5,283,704 | 2/1994 | Reidenbach | 360/104 |
| 5,376,850 | 12/1994 | Elsing et al. | 360/98.07 |
| 5,392,178 | 2/1995 | Nishio et al. | 360/98.07 |
| 5,502,604 | 3/1996 | Furay | 360/97.01 |
| 5,510,940 | 4/1996 | Tacklind et al. | 360/106 |

*Primary Examiner*—John H. Wolff
*Assistant Examiner*—George J. Letscher
*Attorney, Agent, or Firm*—John C. Chen; David B. Harrison

[57] ABSTRACT

A method and arrangement for mounting a rotary actuator bearing cartridge between a disk drive base and cover, are disclosed. The mounting arrangement minimizes any possible deformations to bearing sleeve as well as any effects to bearing preload and friction while enabling a top down assembly.

7 Claims, 2 Drawing Sheets

ACTUATOR BEARING CARTRIDGE FOR TOP DOWN ASSEMBLY

FIELD OF THE INVENTION

The present invention relates to rotary actuators within hard disk drives. More particularly, the present invention relates to a rotary actuator bearing cartridge which enables a top down cover to be attached with minimal effect on bearing preload.

BACKGROUND OF THE INVENTION

In conventional Winchester disk drives, a read/write head or Transducer assembly "flies" upon an air bearing or cushion in very close proximity to the rotating surface of a data storage disk. The disk surface carries a thin film magnetic material having a multiplicity of magnetic storage domains that may be recorded and read back by the head. The transducer assembly, which can be any conventional, combination of transducers, sliders and load beams, is positioned and supported proximate the surface of the data storage disk using a rotary actuator. The combination of the transducer assembly and the rotary actuator is known as the transducer actuator or actuator assembly. The rotary actuator supports the load beams and sliders and accurately positions the transducers above the surface of the disk to read data from and write data to the disk. The rotary actuator may include a bearing assembly, e.g. bearing cartridge, to provide smooth rotational movement of the actuator.

Conventional disk drives may be assembled in a "top down assembly", to facilitate ease of assembly. In the top down assembly, the various parts of a drive are assembled and mounted onto a baseplate of the drive in a progressive manner and without having to "turn" the baseplate over on its other side. Assembling a drive in this manner minimizes the amount of handling required and is thus a preferred method of conventional disk drive manufacturers.

In a conventional disk drive assembly, the rotary actuator may be anchored to the disk drive base and disk drive cover. Such anchoring methods tended to increase bearing preload, resulting in additional stresses to the bearing and actuator arms. One method is illustrated in FIG. 1. As shown, bearing cartridge 25 is seated within a bore 27 defined in the actuator assembly 26. The actuator assembly 26 is anchored to a base 12 with a threaded shaft 21, which may be threaded through a threaded opening in the base 21 or pressed into the opening. After mounting a retaining nut 15 into the other end of the bearing cartridge, a cover 11 is secured thereon with a screw 22. The screw 22 and threaded shaft 21 are designed such that they threadably mate inside the bearing 25. As the screw 22 is tightened to threaded shaft 21, a compressive load F is exerted on bearing cartridge 25. This load F tended to deform the bearing cartridge sleeve as shown in an exaggerated manner in FIG. 1a, increasing friction and bearing preload. As a consequence, bearing life, track seek time and overall drive performance may be adversely effected. In addition this method is not conducive for top down assembly, which makes the assembly process less efficient.

Thus, there exists a hitherto unsolved need for an improved and simple method of securing an actuator bearing cartridge in a top down disk drive assembly which minimizes detrimental effects on drive performance.

SUMMARY OF THE INVENTION

A general object of the present invention is to provide an improved top down assembly rotary actuator bearing cartridge mounted in a manner which overcomes limitations and drawbacks of the prior art.

In accordance with principles of the present invention, a rotary actuator bearing cartridge is secured within a top down assembly disk drive wherein the cartridge is anchored to a disk base plate and a disk cover. The bearing cartridge is seated within a bore in the rotary actuator. The cartridge is anchored at one end to the disk drive base plate using a threaded fastener. The other end of the cartridge is secured to the disk cover using another threaded fastener. This mounting arrangement enables top down assembly while the attachment points at the cover and bearing cartridge creates minimal effect on bearing preload and friction.

BRIEF DESCRIPTION OF THE DRAWINGS

In the Drawings:

FIG. 1a illustrates, in an exaggerated manner, the deforming effect on the bearing cartridge of FIG. 1, resulting from the compressive force F, also shown in FIG. 1.

FIG. 3 is an enlarged view in elevation and section of a top down assembly of the simplified disk drive of FIG. 2.

DETAILED DESCRIPTION OF THE EMBODIMENTS

The details of construction of hard disk drives (HDD's) in which the invention finds utility, are well known to those skilled in the art. Specifically, the assembly and function of HDD components other than those described herein below are discussed in commonly-assigned U.S. Pat. No. 5,319,511, entitled, "Aerodynamic Actuator Latch with Magnetic Return Spring for Hard Disk Drive", the disclosure thereof being incorporated herein by reference. As a result the following description omits describing conventional details of HDD structure and assembly methods other than as related to the best mode of the present invention, and as to enable those skilled in the art to practice the present invention.

Figure 1:
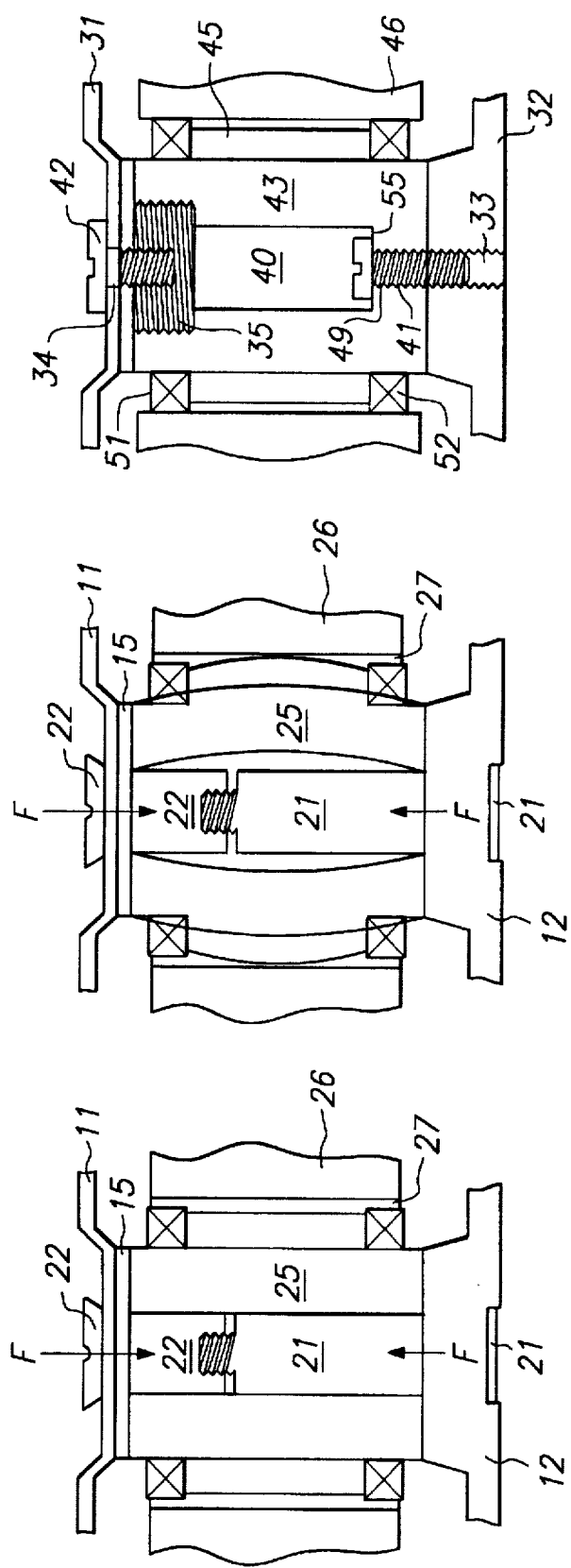
FIG. 1 is an enlarged view in elevation and section illustrating a prior art method of mounting a rotary actuator bearing cartridge in a disk drive.
Figure 2:
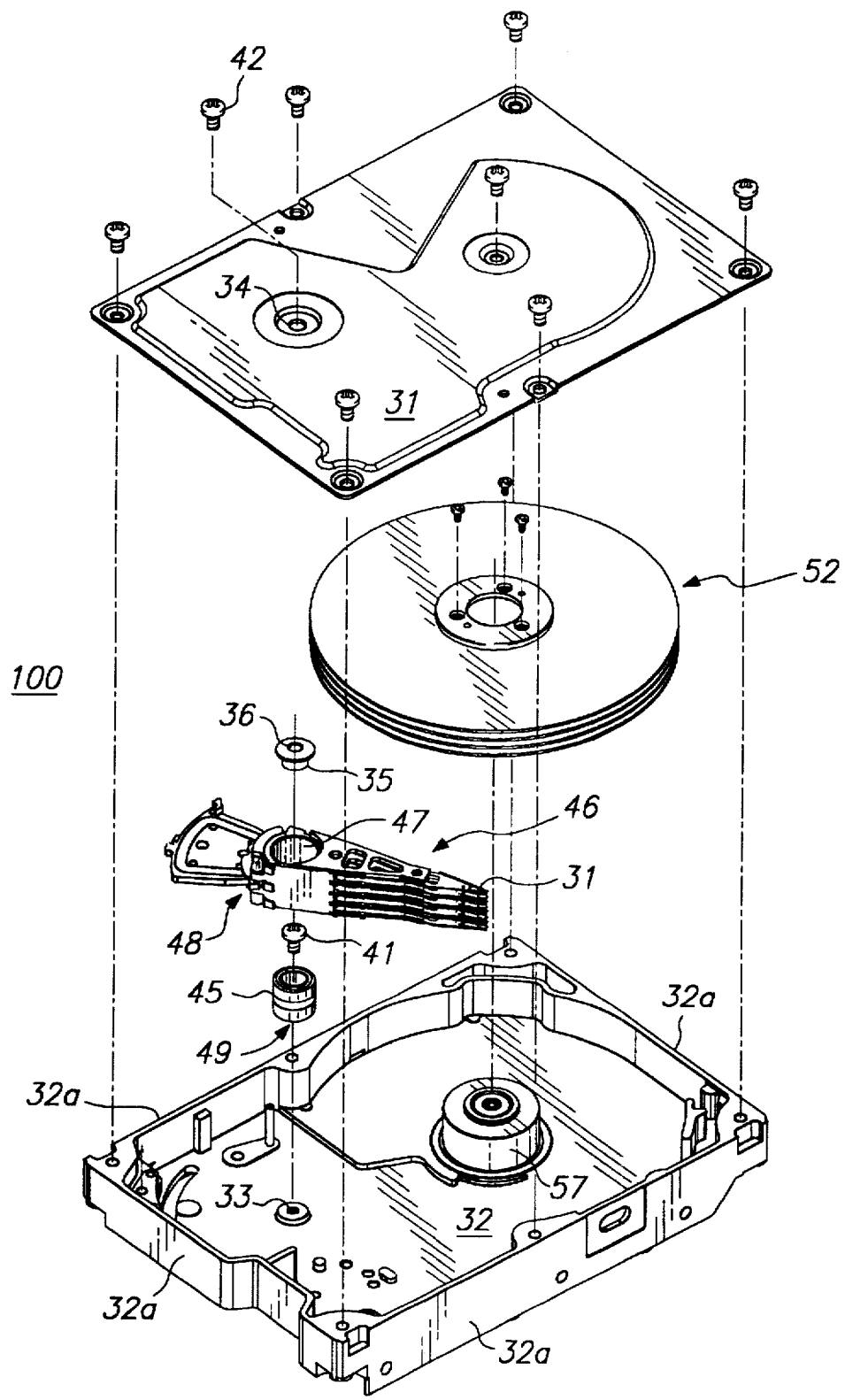
FIG. 2 is an exploded isometric view of a simplified disk drive showing a rotary actuator and a bearing cartridge in accordance with principles of the present invention.

FIG. 2 presents an exploded isometric view of a somewhat simplified hard disk drive 100 in accordance with principles of the present invention. The disk drive, as shown, includes a base 32 preferably formed from steel alloy sheet metal. Alternatively, the base may be an aluminum alloy plate and have sidewalls 32a formed therein. The base 32 supports a rotary voice coil actuator structure 48 which positions at least one data transducer read/write head assembly 31 relative to a multiplicity of concentric data tracks defined on a data storage disk. The embodiment illustrated in FIG. 2 is shown having four data storage disks 52 and eight transducer assemblies. The data storage disks 52 are mounted to a spindle 57 conventionally containing an in-hub spindle motor (not shown). Each transducer assembly 31 is typically swageably mounted to a structural member known as a C-block or E-block. The E-block 46 includes an annular opening 47 defined therein where a bearing cartridge 45 is seated. The bearing cartridge 45, which includes a first and second set of bearings 51, 52 and a shaft 43 having a bore 40 therein, provides smooth rotational movement to the rotary actuator 48. A substantially planar cover 31, preferably formed as a stamped sheet metal plate encloses a space defined by the base 32, data storage disks and rotary actuator 48.

FIG. 3 shows how the bearing cartridge is assembled within the E-block 46 in a top down assembly. As shown, bearing cartridge 45 is seated within the bore 47 of E-block 46 and secured therein with a suitable adhesive. Other means of securing the bearing cartridge 45 may be employed, e.g. a screw, commercial tolerance ring. For purposes of consistency, the end of bearing cartridge 45 seated on disk drive base 32 will herein after be referred to as the bottom end, while the opposite end will be referred to as the top end. In the top down assembly, the E-block 46 and bearing cartridge 45 are placed onto disk drive base 32, then secured therein with a threaded screw 41.

As shown in FIG. 3, bearing cartridge 45 includes a mounting hole 49, defined at an endwall 55 at one end, which is aligned with a threaded opening 33 defined on a raised portion of base 32, when the bearing cartridge 45 is seated against the base. The mounting hole 49 is defined by a diameter smaller than bore 40 such that screw 41 is seated at the bottom of bore 40, against endwall 55. As illustrated in FIG. 3, bearing cartridge 45 is mounted to the base 32 by inserting the screw 41 into bore 40, through bore 49 at the bottom of bearing cartridge 45 and into the threaded opening 33 in disk drive base 32. As the screw 41 is tightened, compressive stress is generated about the endwall 55 of the bearing cartridge 45. However, such stress tends to be restricted to the endwall 55 area rather than being transferred to the bearings 52 and other parts of the rotary actuator (as will be explained herein below).

The top end of the bearing cartridge 45 is then enclosed by a retaining nut 35. The disk cover 31 is then placed over the disk drive assembly and secured to the bearing cartridge 45 with a threaded screw 42. The screw 42 is inserted through a mounting hole 34 in disk cover 31 and engageably mated with a threaded opening 36 in top nut 35. As the top screw 42 is tightened, the retaining torque may also generate compressive load to the top end of the bearing cartridge. However, similar to the stress at the endwall 55, compressive stress tends to remain localized around the top nut 35 area. Thus, minimal stress is transferred to bearing preload of bearing cartridge 45.

As shown in FIG. 2, additional screws and fasteners may be required to complete the mounting of cover 31 onto base 32.

At least two advantages are gained by using the anchoring arrangement of the present invention. First, since the two screws securing the bearing cartridge do not engage with each other, the retaining torque from each respective screw does not have a cumulative effect and thus, tends not to deform the sleeve 43 of the bearing cartridge 45. Accordingly, bearing preload and bearing friction tend not to be effected as well. In addition, this method enables top down assembly, which as previously mentioned, is the preferred method of assembly.

It should be understood that the present invention may be applicable to disk drives which are not top down assembly and still manifest the benefits described herein above. Specifically, bearing preload and friction would unlikely be affected. In addition, other means of securing the bearing cartridge to the base and securing the cover to the top nut may be used.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

What is claimed is:

1. A data storage device comprising:

a base;

at least one data storage disk rotatably mounted to the base;

a rotary actuator assembly for positioning a read/write transducer head relative concentric data tracks defined on the disk, the rotary actuator including a first cylindrical bore axially defined about its rotational;

a bearing cartridge secured within the first bore, the bearing cartridge including an opening at a top end and an endwall defined at a bottom end, and the bearing cartridge providing rotational movement to the actuator;

a first screw for mounting one end of the rotary actuator assembly to the base through the bearing cartridge, the first screw being inserted into a second cylindrical bore axially defined in the bearing cartridge, through a mounting hole defined at the endwall, such that the first screw is seated at the bottom end against the endwall and secured to the base to create a compressive force thereabout;

a cover for enclosing the base; and a second screw for attaching the cover to the other end of the rotary actuator assembly, the second screw attaching independently of the first screw.

2. The data storage device of claim 1, wherein the second screw is inserted through an opening defined in the cover and threaded through a threaded opening in a nut encasing the other end of the rotary actuator.

3. The data storage device of claim 2 wherein the opening in the cover is axially aligned with the threaded opening in the nut when the cover is placed over the base.

4. The data storage device of claim 1 wherein the means for mounting the one end of the rotary actuator assembly and the means for attaching the cover are not engaged.

5. A method of mounting a rotary actuator bearing cartridge in a disk drive assembly, the disk drive assembly including a base, a spindle shaft mounted to the base, at least one data storage disk, a rotary actuator assembly and a cover, the method comprising the steps of:

inserting the bearing cartridge into a first cylindrical bore axially defined in the rotary actuator;

securing the bearing cartridge within the first cylindrical bore;

aligning a second bore defined at an endwall of the bearing cartridge with an opening defined in the base;

inserting the first screw into the bore defined at the endwall of the bearing cartridge such that the first screw is seated against the endwall;

securing the first screw into the opening defined in the base; and tightening the first screw to create a compressive stress about the endwall and the opening of the base; and securing the cover to the bearing cartridge with a second screw.

6. The method of claim 5 wherein the step of securing the cover to the bearing cartridge comprises the steps of:

threading a threaded nut into a threaded opening defined at the other end of the bearing cartridge;

aligning a bore defined in the cover with a threaded opening defined in the nut;

inserting the second screw through the bore defined in the cover;

threading the second screw into the threaded opening defined in the nut; and tightening the second screw.

7. A method of mounting a rotary actuator bearing cartridge in a top down disk drive assembly, the disk drive assembly including a base and a cover, the method comprising:

inserting the bearing cartridge into a first cylindrical bore axially defined in the rotary actuator;

securing the bearing cartridge within the cylindrical bore;

inserting a first fastener into a second cylindrical bore defined in the bearing cartridge, through a mounting hole defined at an endwall about the bottom end of the bearing cartridge and into a threaded opening defined in the base such that the first fastener is seated against the endwall;

tightening the first fastener into the threaded opening defined in the base;

securing a retaining nut onto the top end of the bearing cartridge;

placing the cover over the bearing cartridge and the base such that an attachment opening defined in the cover is aligned with a threaded opening defined in the retaining nut;

inserting a second fastener through the attachment opening defined in the cover and into the threaded opening defined in the retaining nut; and tightening the second fastener wherein the first fastener and the second fastener fasten independently of each other.

* * * * *